US012694645B2

(12) United States Patent
Fouts et al.

(10) Patent No.: US 12,694,645 B2
(45) Date of Patent: Jul. 28, 2026

(54) SYSTEMS AND METHODS FOR AUTOMATICALLY DETECTING SUBSTANCES IN MEDICAL IMAGING

(71) Applicant: Stryker Corporation, Kalamazoo, MI (US)

(72) Inventors: Brian Fouts, Morgan Hill, CA (US); Cole Kincaid Hunter, Santa Clara, CA (US); Aric Josef Beikmann, San Jose, CA (US); John Jingan Tang, San Jose, CA (US); Wenjing Li, Sunnyvale, CA (US); Davin Trey Fish, Provo, UT (US); Brady Lewis Woolford, Mapleton, UT (US)

(73) Assignee: Stryker Corporation, Portage, MI (US)

( * ) Notice: Subject to any disclaimer, the term of this patent is extended or adjusted under 35 U.S.C. 154(b) by 623 days.

(21) Appl. No.: 18/063,669

(22) Filed: Dec. 8, 2022

(65) Prior Publication Data

US 2023/0186602 A1 Jun. 15, 2023

Related U.S. Application Data

(60) Provisional application No. 63/287,950, filed on Dec. 9, 2021.

(51) Int. Cl.
*G06V 10/764* (2022.01)

(52) U.S. Cl.
CPC .................................. *G06V 10/764* (2022.01)

(58) Field of Classification Search
CPC .... G06V 10/764; G06V 10/774; G06V 10/82; G06V 2201/031
See application file for complete search history.

(56) References Cited

U.S. PATENT DOCUMENTS

| | | | |
|---|---|---|---|
| 10,622,102 B2 | 4/2020 | Itu | |
| 10,665,326 B2 | 5/2020 | Aliper | |
| 10,860,836 B1 * | 12/2020 | Tyagi | G06N 3/084 |
| 10,886,008 B2 | 1/2021 | Kamens | |
| 2002/0177780 A1 * | 11/2002 | Sendai | A61B 1/00186 600/476 |

(Continued)

FOREIGN PATENT DOCUMENTS

| | | | |
|---|---|---|---|
| CN | 109580527 A | 4/2019 | |
| WO | WO-2005071639 A1 * | 8/2005 | G09B 23/30 |

(Continued)

*Primary Examiner* — Edward Park
*Assistant Examiner* — Alexander Joseph Vaughn
(74) *Attorney, Agent, or Firm* — Morrison & Foerster LLP

(57) ABSTRACT

A method for training a machine learning model to detect substances that compromise medical imaging clarity includes receiving imaging of tissue associated with a medical procedure type; receiving imaging of one or more substances that can affect clarity of imaging associated with the medical procedure type; combining at least a portion of the imaging of the tissue and at least a portion of the imaging of the one or more substances to generate machine learning training image data in which at least a portion of the tissue is at least partially obscured by the one or more substances; and training, with the training image data, a machine learning model to detect the one or more substances in imaging generated during a medical procedure of the medical procedure type.

20 Claims, 11 Drawing Sheets

(56)  References Cited

U.S. PATENT DOCUMENTS

| 2009/0185730 A1* | 7/2009 | Baumgart ............. A61B 6/504 |
| | | 382/130 |
| 2017/0165008 A1* | 6/2017 | Finley ................. A61B 6/4441 |
| 2018/0065248 A1 | 3/2018 | Barral |
| 2019/0069760 A1* | 3/2019 | Hygelund .......... A61B 1/00006 |

FOREIGN PATENT DOCUMENTS

| WO | 2018/081610 A1 | 5/2018 |
| WO | 2020/157762 A1 | 8/2020 |
| WO | 2021/043747 A1 | 3/2021 |
| WO | WO-2022035774 A1 * | 2/2022 | ......... A61B 1/00006 |

* cited by examiner

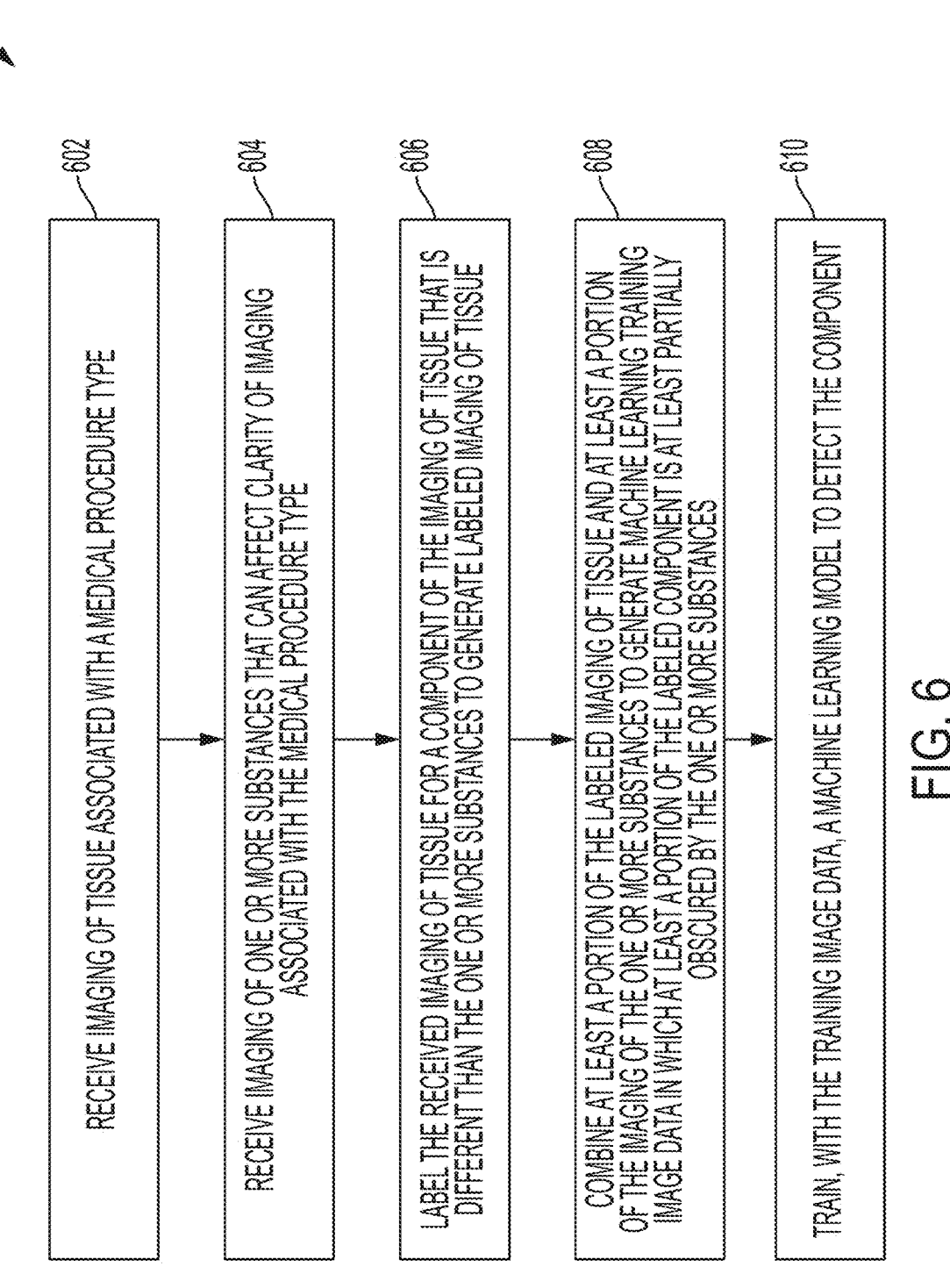

600

602 RECEIVE IMAGING OF TISSUE ASSOCIATED WITH A MEDICAL PROCEDURE TYPE

604 RECEIVE IMAGING OF ONE OR MORE SUBSTANCES THAT CAN AFFECT CLARITY OF IMAGING ASSOCIATED WITH THE MEDICAL PROCEDURE TYPE

606 LABEL THE RECEIVED IMAGING OF TISSUE FOR A COMPONENT OF THE IMAGING OF TISSUE THAT IS DIFFERENT THAN THE ONE OR MORE SUBSTANCES TO GENERATE LABELED IMAGING OF TISSUE

608 COMBINE AT LEAST A PORTION OF THE LABELED IMAGING OF TISSUE AND AT LEAST A PORTION OF THE IMAGING OF THE ONE OR MORE SUBSTANCES TO GENERATE MACHINE LEARNING TRAINING IMAGE DATA IN WHICH AT LEAST A PORTION OF THE LABELED COMPONENT IS AT LEAST PARTIALLY OBSCURED BY THE ONE OR MORE SUBSTANCES

610 TRAIN, WITH THE TRAINING IMAGE DATA, A MACHINE LEARNING MODEL TO DETECT THE COMPONENT

FIG. 6

SYSTEMS AND METHODS FOR AUTOMATICALLY DETECTING SUBSTANCES IN MEDICAL IMAGING

CROSS-REFERENCE TO RELATED APPLICATIONS

This application claims the benefit of U.S. Provisional Application No. 63/287,950, filed Dec. 9, 2021, the entire contents of which are hereby incorporated by reference herein.

FIELD

This disclosure generally relates to medical imaging and, more specifically, to automatic identification of substances in medical imaging.

BACKGROUND

Minimally invasive surgery generally involves the use of a high-definition camera coupled to an endoscope inserted into a patient to provide a surgeon with a clear and precise view within the body. When the endoscope is inserted into the internal area of a patient's body during a minimally invasive surgery, it is important to maintain an environment within the internal area that is conducive to clearly visualizing the area by the camera. For instance, keeping the internal area clear of blood, debris, smoke, or other substances that can negatively impact imaging quality is important to ensuring that a surgeon or other practitioner has adequate visibility of the internal area.

One way to keep an internal area relatively free and clear of visual disturbances during an endoscopic procedure is to irrigate the internal area with a clear fluid such as saline during the procedure. Irrigation involves introducing a clear fluid into the internal area at a particular rate (i.e., inflow), and removing the fluid by suction (i.e., outflow) such that a desired fluid pressure is maintained in the internal area. The constant flow of fluid can serve two purposes. First, the constant flow of fluid through the internal area of the patient can help to remove debris from the field of view of the imaging device, as the fluid carries the debris away from the area and is subsequently suctioned out of the area. Second, the fluid creates a pressure build up in the internal area which works to suppress bleeding by placing pressure on blood vessels in or around the internal area.

Irrigating an internal area during a minimally invasive surgery comes with risks. Applying too much pressure to a joint or other internal area of a patient can cause injury to the patient and can even permanently damage the area. Thus, during an endoscopic procedure, the fluid delivered to an internal area is managed to ensure that the pressure is high enough to keep the internal area clear for visualization, but low enough so as to not cause the patient harm. Surgical pumps can be utilized to perform fluid management during an endoscopic procedure. Surgical pumps regulate the inflow and outflow of irrigation fluid to maintain a particular pressure inside an internal area being visualized. The surgical pump can be configured to allow for the amount of pressure to be applied to an internal area to be adjusted during a surgery.

The amount of pressure needed during a surgery can be dynamic depending on a variety of factors. For instance, the amount of pressure to be delivered can be based on the joint being operated on, the amount of bleeding in the area, as well the absence or presence of other instruments. Having the surgeon manually manage fluid pressure during a surgery can place a substantial cognitive burden on them. The surgeon has to ensure that the pump is creating enough pressure to allow for visualization of the internal area, while simultaneously minimizing the pressure in the internal area to prevent injury or permanent damage to the patient. In an environment where the pressure needs are constantly changing based on conditions during the operation, the surgeon will have to constantly adjust the pressure settings of the pump to respond to the changing conditions. These constant adjustments can be distracting, and reduce the amount of attention that the surgeon can devote to the procedure itself.

SUMMARY

According to various aspects, artificially generated training data is generated for training a machine learning model to detect one or more substances that can cause visual disturbances or otherwise affect clarity in medical imaging. The training data may be generated based on imaging of tissue that is free of these substances in combination with imaging of the substances by themselves. The imaging of the substances may be generated, for example, using a fixture through which the substances are directed to mimic the typical transient movement of the substances through a field of view during a typical medical imaging session. The training data may instead or additionally be generated using machine learning models trained using real (i.e., not artificial) intraoperative images of tissue, including images free of substances and images obstructed by substances. Examples of substances that can cause visual disturbances or otherwise affect clarity in medical imaging include blood, debris, bubbles, and smoke. The artificially generated training data includes images and/or video frames in which the substances at least partially obscure at least a portion of the tissue imaging. This artificial training data can then be used to train a machine learning model to automatically detect the substances in medical imaging. The automatic detection of the substances can trigger automatic actions that enhance imaging clarity, such as automatic adjustment of fluid flows through a surgical cavity or automatic adjustment of the imaging via image processing to enhance clarity of the imaging.

According to an aspect, a method for training a machine learning model to detect substances that compromise medical imaging clarity includes receiving imaging of tissue associated with a medical procedure type; receiving imaging of one or more substances that can affect clarity of imaging associated with the medical procedure type; combining at least a portion of the imaging of the tissue and at least a portion of the imaging of the one or more substances to generate machine learning training image data in which at least a portion of the tissue is at least partially obscured by the one or more substances; and training, with the training image data, a machine learning model to detect the one or more substances in imaging generated during a medical procedure of the medical procedure type.

Optionally, the imaging of the tissue and the imaging of the one or more substances were captured by the same type of imaging device.

Optionally, the imaging of the tissue and the imaging of the one or more substances were captured by one or more endoscopic imagers.

Optionally, the imaging of the one or more substances was generated using a fixture through which the one or more substances were directed. The combining at least a portion of the imaging of the tissue and at least a portion of the imaging of the one or more substances may include isolating the one or more substances in the at least a portion of the imaging of the one or more substances using a clear frame of the fixture.

Optionally, the imaging of tissue associated with a medical procedure type is free of the one or more substances.

Optionally, the imaging of the tissue is imaging of cadaveric tissue.

Optionally, the one or more substances include smoke, blood, debris, or bubbles.

Optionally, combining at least a portion of the imaging of the tissue and at least a portion of the imaging of the one or more substances includes at least one color inversion step.

Optionally, combining at least a portion of the imaging of the tissue and at least a portion of the imaging of the one or more substances includes isolating portions corresponding to the one or more substances in the at least a portion of the imaging of the one or more substances, inverting colors of the isolated portion, and subtracting the inverted colors of the isolated portions from the at least a portion of the imaging of the tissue.

Optionally, combining at least a portion of the imaging of the tissue and at least a portion of the imaging of the one or more substances includes at least one alignment, rotation, or translation step.

Optionally, the training image data includes multiple combinations of the at least a portion of the imaging of the tissue and the at least a portion of the imaging of the one or more substances, each combination differing in at least one of rotation and translation of the at least a portion of the imaging of the one or more substances.

Optionally, combining at least a portion of the imaging of the tissue and at least a portion of the imaging of the one or more substances includes extracting respective circles from the at least a portion of the imaging of the tissue and the at least a portion of the imaging of the one or more substances, determining a resizing for matching the respective circles, and applying the resizing to at least one of the at least a portion of the imaging of the tissue and the at least a portion of the imaging of the one or more substances.

Optionally, the at least a portion of the imaging of the tissue is combined with the at least a portion of the imaging of the one or more substances using a weighted average.

Optionally, the medical procedure type is endoscopic surgery.

According to an aspect, a system for training a machine learning model to detect substances that compromise medical imaging clarity includes one or more processors, memory, and one or more programs stored in the memory for execution by the one or more processors for: receiving imaging of tissue associated with a medical procedure type; receiving imaging of one or more substances that can affect clarity of imaging associated with the medical procedure type; combining at least a portion of the imaging of the tissue and at least a portion of the imaging of the one or more substances to generate machine learning training image data in which at least a portion of the tissue is at least partially obscured by the one or more substances; and training, with the training image data, a machine learning model to detect the one or more substances in imaging generated during a medical procedure of the medical procedure type.

Optionally, the imaging of the tissue and the imaging of the one or more substances were captured by the same type of imaging device.

Optionally, the imaging of the tissue and the imaging of the one or more substances were captured by one or more endoscopic imagers.

Optionally, the imaging of the one or more substances was generated using a fixture through which the one or more substances were directed. The combining at least a portion of the imaging of the tissue and at least a portion of the imaging of the one or more substances may include isolating the one or more substances in the at least a portion of the imaging of the one or more substances using a clear frame of the fixture.

Optionally, the imaging of tissue associated with a medical procedure type is free of the one or more substances.

Optionally, the imaging of the tissue is imaging of cadaveric tissue.

Optionally, the one or more substances include smoke, blood, debris, or bubbles.

Optionally, combining at least a portion of the imaging of the tissue and at least a portion of the imaging of the one or more substances includes at least one color inversion step.

Optionally, combining at least a portion of the imaging of the tissue and at least a portion of the imaging of the one or more substances includes isolating portions corresponding to the one or more substances in the at least a portion of the imaging of the one or more substances, inverting colors of the isolated portion, and subtracting the inverted colors of the isolated portions from the at least a portion of the imaging of the tissue.

Optionally, combining at least a portion of the imaging of the tissue and at least a portion of the imaging of the one or more substances includes at least one alignment, rotation, or translation step.

Optionally, the training image data includes multiple combinations of the at least a portion of the imaging of the tissue and the at least a portion of the imaging of the one or more substances, each combination differing in at least one of rotation and translation of the at least a portion of the imaging of the one or more substances.

Optionally, combining at least a portion of the imaging of the tissue and at least a portion of the imaging of the one or more substances includes extracting respective circles from the at least a portion of the imaging of the tissue and the at least a portion of the imaging of the one or more substances, determining a resizing for matching the respective circles, and applying the resizing to at least one of the at least a portion of the imaging of the tissue and the at least a portion of the imaging of the one or more substances.

Optionally, the at least a portion of the imaging of the tissue is combined with the at least a portion of the imaging of the one or more substances using a weighted average.

Optionally, the medical procedure type is endoscopic surgery.

According to an aspect, a method for detecting substances that compromise medical imaging clarity includes receiving imaging generated during a medical procedure of a medical procedure type; and detecting one or more substances that compromise clarity in the imaging generated during the medical procedure using a machine learning model, wherein the machine learning model was trained on training image data generated by combining at least a portion of imaging of tissue associated with the medical procedure type and at least a portion of imaging of the one or more substances such that at least a portion of the tissue is at least partially obscured by the one or more substances.

Optionally, the imaging generated during a medical procedure, the imaging of the tissue, and the imaging of the one or more substances were captured by the same type of imaging device.

Optionally, the imaging generated during a medical procedure, the imaging of the tissue, and the imaging of the one or more substances were captured by one or more endoscopic imagers.

Optionally, the imaging of the one or more substances was generated using a fixture through which the one or more substances were directed. The at least a portion of the imaging of the tissue and the at least a portion of the imaging of the one or more substances may have been combined by isolating the one or more substances in the at least a portion of the imaging of the one or more substances using a clear frame of the fixture.

Optionally, the one or more substances comprise smoke, blood, debris, or bubbles.

Optionally, the training image data comprises multiple combinations of the at least a portion of the imaging of the tissue and the at least a portion of the imaging of the one or more substances, each combination differing in at least one of rotation and translation of the at least a portion of the imaging of the one or more substances.

Optionally, the medical procedure type is endoscopic surgery.

According to an aspects, a system for detecting substances that compromise medical imaging clarity includes one or more processors, memory, and one or more programs stored in the memory for execution by the one or more processors for: receiving imaging generated during a medical procedure of a medical procedure type; and detecting one or more substances that compromise clarity in the imaging generated during the medical procedure using a machine learning model, wherein the machine learning model was trained on training image data generated by combining at least a portion of imaging of tissue associated with the medical procedure type and at least a portion of imaging of the one or more substances such that at least a portion of the tissue is at least partially obscured by the one or more substances.

Optionally, the imaging generated during a medical procedure, the imaging of the tissue, and the imaging of the one or more substances were captured by the same type of imaging device.

Optionally, the imaging generated during a medical procedure, the imaging of the tissue, and the imaging of the one or more substances were captured by one or more endoscopic imagers.

Optionally, the imaging of the one or more substances was generated using a fixture through which the one or more substances were directed. The at least a portion of the imaging of the tissue and the at least a portion of the imaging of the one or more substances may have been combined by isolating the one or more substances in the at least a portion of the imaging of the one or more substances using a clear frame of the fixture.

Optionally, the one or more substances comprise smoke, blood, debris, or bubbles.

Optionally, the training image data comprises multiple combinations of the at least a portion of the imaging of the tissue and the at least a portion of the imaging of the one or more substances, each combination differing in at least one of rotation and translation of the at least a portion of the imaging of the one or more substances.

Optionally, the medical procedure type is endoscopic surgery.

According to an aspect, a method for training a machine learning model includes: receiving imaging of tissue associated with a medical procedure type; receiving imaging of one or more substances that can affect clarity of imaging associated with the medical procedure type; labeling the received imaging of tissue for a component of the imaging of tissue that is different than the one or more substances to generate labeled imaging of tissue; combining at least a portion of the labeled imaging of tissue and at least a portion of the imaging of the one or more substances to generate machine learning training image data in which at least a portion of the labeled component is at least partially obscured by the one or more substances; and training, with the training image data, a machine learning model to detect the component.

Optionally, the component of the imaging of tissue is an anatomical feature.

Optionally, the imaging of the tissue and the imaging of the one or more substances were captured by the same type of imaging device.

Optionally, the imaging of the tissue and the imaging of the one or more substances were captured by one or more endoscopic imagers.

Optionally, the imaging of the one or more substances was generated using a fixture through which the one or more substances were directed. Combining the at least a portion of the labeled imaging of tissue and the at least a portion of the imaging of the one or more substances can include isolating the one or more substances in the at least a portion of the imaging of the one or more substances using a clear frame of the fixture.

Optionally, the imaging of tissue associated with a medical procedure type is free of the one or more substances.

Optionally, the imaging of the tissue is imaging of cadaveric tissue.

Optionally, the one or more substances comprise smoke, blood, debris, or bubbles.

Optionally, combining the at least a portion of the labeled imaging of tissue and the at least a portion of the imaging of the one or more substances comprises at least one color inversion step.

Optionally, combining the at least a portion of the labeled imaging of tissue and the at least a portion of the imaging of the one or more substances comprises isolating portions corresponding to the one or more substances in the at least a portion of the imaging of the one or more substances, inverting colors of the isolated portion, and subtracting the inverted colors of the isolated portions from the at least a portion of the imaging of the tissue.

Optionally, combining the at least a portion of the labeled imaging of tissue and the at least a portion of the imaging of the one or more substances comprises at least one alignment, rotation, or translation step.

Optionally, the training image data comprises multiple combinations of the at least a portion of the labeled imaging of tissue and the at least a portion of the imaging of the one or more substances, each combination differing in at least one of rotation and translation of the at least a portion of the imaging of the one or more substances.

Optionally, combining the at least a portion of the labeled imaging of tissue and the at least a portion of the imaging of the one or more substances comprises extracting respective circles from the at least a portion of the imaging of the tissue and the at least a portion of the imaging of the one or more substances, determining a resizing for matching the respective circles, and applying the resizing to at least one of the at least a portion of the imaging of the tissue and the at least a portion of the imaging of the one or more substances.

Optionally, the at least a portion of the labeled imaging of the tissue is combined with the at least a portion of the imaging of the one or more substances using a weighted average.

Optionally, the medical procedure type is endoscopic surgery.

According to an aspect, a system for detecting substances that compromise medical imaging clarity includes one or more processors, memory, and one or more programs stored in the memory for execution by the one or more processors for: receiving imaging of tissue associated with a medical procedure type; receiving imaging of one or more substances that can affect clarity of imaging associated with the medical procedure type; labeling the received imaging of tissue for a component of the imaging of tissue that is different than the one or more substances to generate labeled imaging of tissue; combining at least a portion of the labeled imaging of tissue and at least a portion of the imaging of the one or more substances to generate machine learning training image data in which at least a portion of the labeled component is at least partially obscured by the one or more substances; and training, with the training image data, a machine learning model to detect the component.

Optionally, the component of the imaging of tissue is an anatomical feature.

Optionally, the imaging of the tissue and the imaging of the one or more substances were captured by the same type of imaging device.

Optionally, the imaging of the tissue and the imaging of the one or more substances were captured by one or more endoscopic imagers.

Optionally, the imaging of the one or more substances was generated using a fixture through which the one or more substances were directed. Combining the at least a portion of the labeled imaging of tissue and the at least a portion of the imaging of the one or more substances can include isolating the one or more substances in the at least a portion of the imaging of the one or more substances using a clear frame of the fixture.

Optionally, the imaging of tissue associated with a medical procedure type is free of the one or more substances.

Optionally, the imaging of the tissue is imaging of cadaveric tissue.

Optionally, the one or more substances comprise smoke, blood, debris, or bubbles.

Optionally, combining the at least a portion of the labeled imaging of tissue and the at least a portion of the imaging of the one or more substances comprises at least one color inversion step.

Optionally, combining the at least a portion of the labeled imaging of tissue and the at least a portion of the imaging of the one or more substances comprises isolating portions corresponding to the one or more substances in the at least a portion of the imaging of the one or more substances, inverting colors of the isolated portion, and subtracting the inverted colors of the isolated portions from the at least a portion of the imaging of the tissue.

Optionally, combining the at least a portion of the labeled imaging of tissue and the at least a portion of the imaging of the one or more substances comprises at least one alignment, rotation, or translation step.

Optionally, the training image data comprises multiple combinations of the at least a portion of the labeled imaging of tissue and the at least a portion of the imaging of the one or more substances, each combination differing in at least one of rotation and translation of the at least a portion of the imaging of the one or more substances.

Optionally, combining the at least a portion of the labeled imaging of tissue and the at least a portion of the imaging of the one or more substances comprises extracting respective circles from the at least a portion of the imaging of the tissue and the at least a portion of the imaging of the one or more substances, determining a resizing for matching the respective circles, and applying the resizing to at least one of the at least a portion of the imaging of the tissue and the at least a portion of the imaging of the one or more substances.

Optionally, the at least a portion of the labeled imaging of the tissue is combined with the at least a portion of the imaging of the one or more substances using a weighted average.

Optionally, the medical procedure type is endoscopic surgery.

BRIEF DESCRIPTION OF THE FIGURES

The invention will now be described, by way of example only, with reference to the accompanying drawings, in which:

FIG. 6 is a block diagram of an exemplary method for training a machine learning model to detect one or more components in imaging when the imaging includes one or more substances that affect clarity;

DETAILED DESCRIPTION

Figure 1:
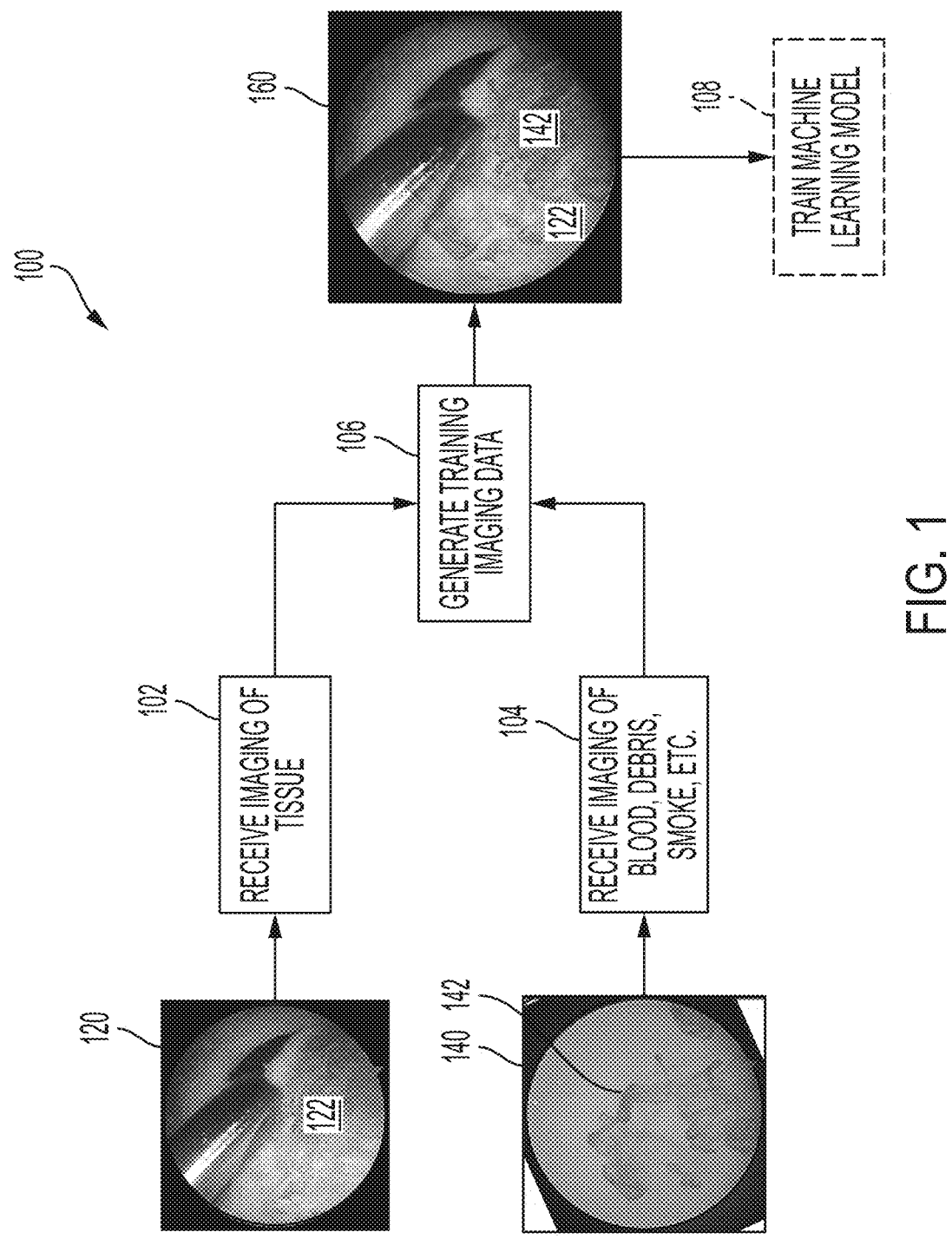
FIG. 1 illustrates an exemplary method for generating training data for training a machine learning model to automatically identify substances that affect clarity in medical imaging.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Systems and methods, according to various aspects, include generating artificial training data that can be used for training machine learning models to detect substances that affect clarity or visibility in medical imaging. The artificial training data can be generated by combining imaging of tissue with imaging of the one or more substances to create artificial imaging in which the one or more substances obscure at least a portion of the tissue. Artificial training data can additionally or alternatively be generated using machine learning models trained using real intraoperative images of tissue, including images free of substances and images obstructed by substances. This artificial training data can be used to train a machine learning model to automatically detect the one or more substances in medical imaging. The artificial training data can additionally or alternatively be used to test the ability of a machine learning model to automatically detect the one or more substances in medical imaging.

Substances that can affect clarity or visibility of medical imaging can include blood, bubbles, debris, smoke, surgical tools, medical devices (e.g., sutures), and other obstructions that may appear within a field of view during medical imaging and may negatively affect imaging quality by at least partially obscuring features of interest in the imaging, such as tissue. While a machine learning model could be trained on real imaging in which one or more substances that affect clarity or visibility of tissue are present in a field of view, this type of imaging may be difficult to obtain, particularly when there are other criteria that the imaging must meet, including, for example, a particular procedure type, particular tissue within the field of view, particular imaging modalities, etc. Further, real imaging that includes the substances and meets the necessary criteria may have restrictions on usage, such that it may be unavailable for use for training a machine learning model. Even where imaging that meets all requirements and is available for use can be found, there simply may not be a sufficient amount to adequately train a machine learning model, making the machine learning model less accurate and/or robust to different situations. Systems and methods described herein avoid these issues by enabling the generation of artificial training data using imaging of the one or more clarity-affecting substances that was not generated in a medical imaging session in combination with imaging of tissue that was generated during medical imaging session but without the presence of the substances. The imaging of the one or more substances may be non-tissue imaging—i.e., imaging that does not include any tissue. This imaging may be generated using, for example, a fixture through which the substances are directed to mimic the transient movement of the substances through a medical imaging field of view, or the imaging could be pre-existing imaging, including pre-existing non-medical imaging, which may be more widely available since it is not generated from a medical procedure. Since the clarity-affecting substance imaging may not involve tissue imaging, it may be easier to generate and/or obtain a desired amount and variety. Further, since the tissue imaging does not include the one or more substances, suitable imaging may be more widely available or may be generated using a cadaver or human substitute (e.g., pigs or other animals).

Additionally or alternatively, systems and methods described herein may utilize machine learning models, such as generative adversarial networks (GANs), to generate training data for training a machine learning model to detect substances in medical imaging. The GANs may themselves be trained using previously captured, real intraoperative imaging, including images that include substances that affect their clarity or visibility and images free of the substances. In particular, the GANs may be trained using a limited amount of diverse training data (e.g., training data representative of the various detectable obstructions, procedure types, tissue types, imaging modalities, etc.). Using machine learning models such as GANs, artificial images of tissues that are free of substances and also those that comprise the substances may be generated and used as training data for training a machine learning model to detect the substances in medical imaging.

The systems and methods, according to various aspects, can enable the production of many thousands of training images and/or video frames (as used herein, "images," "video frames," and "frames" are used interchangeably), which can be produced on demand for any given machine learning model training and can be stored for future machine learning model training. Further, the amount of clarity-affecting substances in the resulting frames can be controlled to maximize the effectiveness of the specific machine learning model training being undertaken.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an exemplary method 100 for generating training data for training a machine learning model to automatically detect substances that can compromise medical imaging clarity. At step 102, imaging of tissue associated with a medical procedure type is received by a computing system. FIG. 1 includes an exemplary endoscopic image 120 that includes tissue 122 but does not include any of the one or more substances that affect clarity of the imaging.

The tissue imaging can include one or more individual snapshot images and/or one or more video frames (the reference to "image" below encompasses both a single snapshot image and a video frame). The tissue imaging can be received from a database storing the imaging and/or can be received from one or more imaging systems. The medical procedure type can be any medical procedure type and generally corresponds to a medical procedure type for which a machine learning model may be trained. For example, for training a machine learning model to automatically detect smoke during a laparoscopic procedure (such as for automatically determining when to increase insufflation gas flow to clear the smoke), the imaging of tissue associated with a medical procedure type can be imaging generated during a laparoscopic procedure or a specific type of laparoscopic procedure. As another example, for training a machine learning model to automatically detect blood during an arthroscopic procedure (such as for automatically determining when to increase irrigation flow to clear the blood), the imaging of tissue associated with a medical procedure type can be imaging generated during an arthroscopic procedure or a specific type of arthroscopic procedure. The imaging can be imaging of a cadaver. The type of imaging is not limited. Imaging can be, for example, endoscopic imaging, open field imaging, and non-surgical imaging, and can capture any anatomy suitable for a desired application. In some variations, imaging associated with different medical procedure types is received. For example, arthroscopic imaging and laparoscopic imaging may be received for generated training data for training a machine learning model that could be used for laparoscopic imaging and arthroscopic imaging.

At step 104, imaging of one or more substances that can affect clarity of imaging associated with the medical procedure type is received by the computing system. FIG. 1 includes an exemplary endoscopic image 140 that includes blood 142. (As used herein "blood" includes modified or un-modified human blood, modified or non-modified nonhuman blood, and simulated blood. Modified blood can include blood with added anti-coagulant, such as heparin, warfarin, and/or any other anti-coagulant suitable for the modified blood.) The image 140 was captured as the blood was moving through the field of view of the imaging system that captured image 140. The imaging can include one or more individual snapshot images and/or one or more video frames. The imaging can be received from a database storing the imaging and/or can be received from one or more imaging systems. The one or more substances can be any substance that affects clarity of imaging associated with the medical procedure type. For example, during a medical imaging session associated with a particular medical procedure type, it may frequently occur that the one or more substances appear within the field of view and may at least partially obscure at least a portion of tissue of interest in the imaging. The one or more substances may typically appear in the imaging in a transient nature in the sense that the one or more substances may not always be within the field of view or may be moving through the field of view either naturally or due to the pumping of liquid or gas through a surgical cavity. Examples of these substances include blood, debris, bubbles, surgical tools, medical devices (e.g., sutures), and smoke, each of which may obscure visualization of tissue. The imaging may comprise real intraoperative images of tissue that includes, in addition to tissue, one or more substances. The imaging of the one or more substances may include just the one or more substances—i.e., there are no other features visible in the imaging other than, for example, a uniform background. Taking blood as an example, the imaging may be imaging of blood alone without anything else visible in the imaging and/or it may be imaging of blood and tissue. In the instance the imaging comprises only the substance (i.e., no tissue), the imaging may have been generated using a fixture or other artificial setup useful for capturing imaging of the substance by itself, examples of which are described further below.

At step 106, training data is generated based on the imaging of the tissue and the imaging of the one or more clarity-affecting substances. The imaging of the one or more substances can be superimposed on or otherwise combined with the imaging of the tissue such that the one or more substances at least partially obscure at least a portion of the tissue. For example, image 140 can be superimposed on or otherwise combined with image 120 to create training image 160, which includes the blood 142 obscuring a portion of the tissue 122. The tissue imaging and imaging of one or more substances can be combined in any suitable fashion. Imaging of the one or more substances may be aligned, translated, resized, cropped, or otherwise altered when combining with imaging of tissue and/or imaging of the tissue may be aligned, translated, resized, cropped, or otherwise altered when combining with imaging of one or more substances.

Different training images may be generated by combining the tissue imaging and clarity-affecting substance imaging in different ways. For example, the same image of the one or more substances can be combined with multiple different images of tissue and can be combined in different ways (for example, using different translations, rotations, and/or scalings of the same image). Similarly, the same tissue image can be combined with multiple different images of the one or more substances. Videos of tissue can be combined with videos of the one or more substances moving through the field of view on a frame by frame basis. Different weighting techniques can be used to combine the imaging such that the one or more substances are more or less prominent in the training imaging. In some variations, the training images include multiple combinations of the at least a portion of the imaging of the tissue and the at least a portion of the imaging of the one or more substances, each combination differing in at least one of rotation and translation of the at least a portion of the imaging of the one or more substances.

Training data may instead or additionally be generated at step 106 using one or more machine learning models. Images such as images 120, 140 may be provided as input to a machine learning model (e.g., a first machine learning model) used to generate artificial training data for a machine learning model used to detect substances in medical imaging (e.g., a second machine learning model). The first machine learning model (or models) may comprise one or more generative adversarial networks (GANs). The use of GANs (and other similar machine learning models not explicitly stated herein) may be beneficial in that they may necessitate only a limited amount of diverse training data to enable the generation of hundreds or thousands of artificial training images. In addition, GANs may consider the statistical distribution of the input data, thereby generating output data with a distribution that resembles the input distribution. By modeling the distribution of the input data, error may be minimized in downstream uses of the artificial training data, such as by the second machine learning model to detect substances in imaging.

The first machine learning model (e.g., one or more GANs) may be trained using a variety of intraoperative images. The training dataset used for training the first machine learning model may comprise images of different types of substances (e.g., blood, smoke, debris, bubbles, medical devices, surgical tools, etc.), different imaging modalities, different procedure types, different anatomical features, and/or different sources (e.g., live patients, animals, cadavers, etc.). In some examples, the first machine learning network may not require the substances (e.g., blood) to be isolated from tissue in the training images of the network, as described above at least with respect to step 104 and image 140.

GAN frameworks may comprise a generator network and a discriminator network. The generator network may be configured to receive an original set of images and may generate an artificial set of images based on the original images. The discriminator network may be configured to receive the output of the generator network (e.g., the artificial set of images) and evaluate the artificial set of images based on a ground truth (e.g., an original set of images). The discriminator may be configured to output whether a given image in the artificial set of images meets or exceeds the evaluation criteria. Based on the output from the discriminator network, the weights of the generator network may be updated (e.g., via backpropagation through the discriminator network to the generator).

Generative adversarial networks (GANs) that may be used to generate artificial training data may comprise unconditional and/or class-conditional GANs. Unconditional GANs (e.g., NVIDIA's StyleGAN-2-ADA) may accept as input a randomized set of images from different classes (e.g., blood, smoke, debris, bubbles, etc.) and provide as output images representative of the randomized set of images. In contrast, class-conditional GANs (e.g., variations of Style-GAN-2-ADA) may use additional data (e.g., labels) as input in addition to the original images, which in turn may allow a user of the network to specify the type of images to be generated as output by the network. Using machine learning models such as GANs, artificial training images including those which may be free from substances and those comprising one or more substances may be generated and used in downstream tasks.

Step 102 to 106 may be performed repeatedly to generate many hundreds or thousands of different training images. The number of training images is not limited. Sets of training images may be generated for different medical procedure types by using tissue imaging associated with different medical procedure types. Sets of training images may be generated for different substances by using imaging of different substances.

The training imaging generated at step 106 may be labeled for use in supervised machine learning model training. The labeling may be applied to the imaging of the one or more substances prior to combining with the tissue imaging or may be applied to the imaging resulting from the combining of the tissue imaging with the substance imaging.

Method 100 may include optional step 108 which includes training a machine learning model based on the training imaging generated at step 106. Additionally or alternatively, the training imaging can be stored in a memory for future use for training one or more machine learning models.

Figures 2A, 2B:
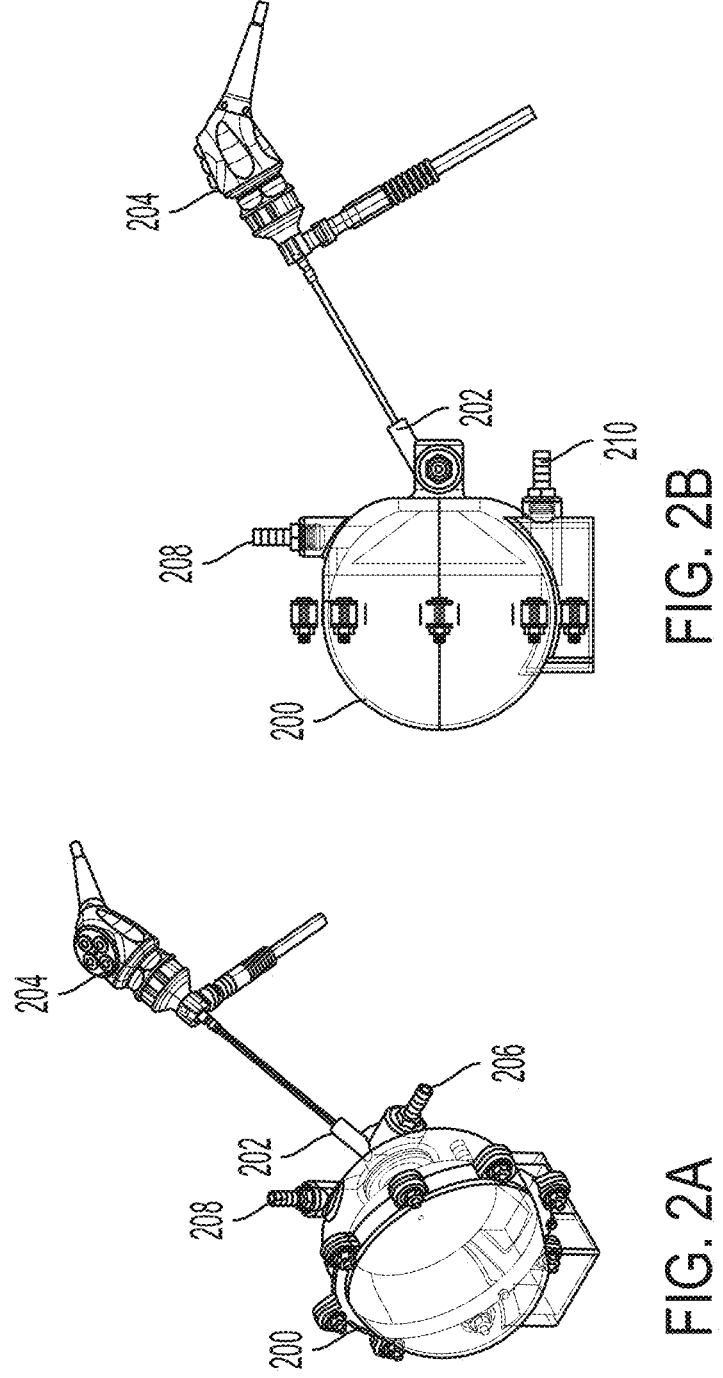
FIGS. 2A and 2B illustrate an exemplary fixture that can be used to capture imaging of one or more substances that can affect clarity in medical imaging.

As noted above, images of one or more substances that can affect clarity of imaging can be generated using a fixture or other setup that can simulate the movement of the one or more substances through an imaging field of view. FIGS. 2A and 2B illustrate an exemplary fixture 200 that can be used to capture endoscopic imaging of one or more substances. Fixture 200 can include an imager port 202 for positioning an imager 204 such that the imager 204 can image within an imaging chamber within the fixture 200. In the illustrated example, the imager 204 is an endoscopic imager with its scope inserted into the imager port 202. The type of imager used can be selected based on the type of imager used for generating the tissue imaging with which the imaging generated using fixture 200 will be combined. For example, where an endoscopic imager or specific type of endoscopic imager is used for tissue imaging, the same endoscopic imager or same type of endoscopic imager may be used for capturing images using fixture 200. The imager 204 can be used to capture snapshot images and/or video of the one or more substances as the one or more substances move through the field of view. The chamber within the fixture 200 can be configured to provide high contrast with the one or more substances imaged within the fixture 200. For example, the chamber may be white in color for imaging blood or debris or black in color for imaging smoke or bubbles.

Fixture 200 can include at least one port 206 for injecting one or more substances into the imaging chamber of the fixture 200 so that the substances are within the field of view of the imager 204 positioned in the imager port 202. Fixture 200 can include ports 208, 210 for connecting fluid supply and drain lines for flowing fluid through the fixture 200 to simulate the flow of fluid through a surgical cavity. A substance injected through the port 206 may become entrained in a flow of fluid through the imaging chamber of the fixture 200, simulating the entrainment of the substance in the flow of fluid through a surgical cavity. The fluid can be a liquid, which can be used, for example, for simulating the flow of liquid during arthroscopic surgical procedure, or can be a gas, which can be used, for example, for simulating the flow of insufflation gas during a laparoscopic surgical procedure. A fluid flow rate and substance injection amount and/or rate can be fine-tuned to create a desired appearance of the substance in imaging captured by the imager 204 such that the substance looks similar to how the substance would appear in imaging in an actual medical imaging session. For example, with reference to FIG. 1, which was generated using fixture 200, the appearance of the blood 142 in endoscopic image 140 simulates the appearance of blood 142 flowing through a surgical field during an arthroscopic surgical procedure.

Imaging of the one or more substances used in step 106 need not be limited to imaging of the one or more substances generated using a fixture. Rather, any imaging that includes the one or more substances can be used. The imaging may be, for example, endoscopic imaging captured during a surgical procedure at a time when the one or more substances were present within the field of view. The one or more substances can be extracted from such imaging and combined with imaging of tissue to generate imaging that includes the tissue at least partially obscured by the one or more substances. The extracted substance(s) can be combined with different tissue imaging and/or in different ways to generate different training imaging, thus greatly expanding the amount of training data.

Figure 3:
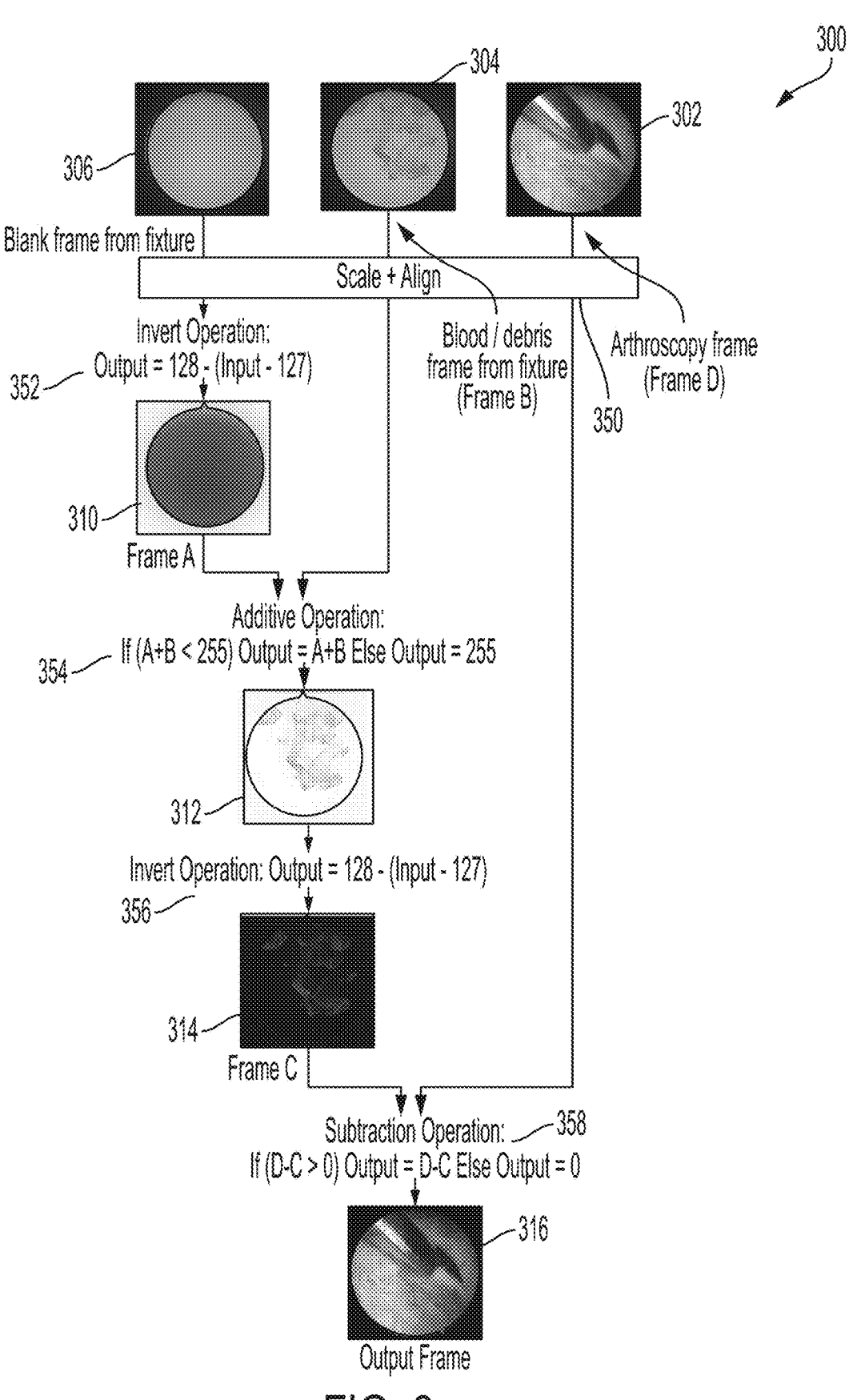
FIG. 3 illustrates an exemplary method for combining tissue imaging with imaging of one or more substances that can affect clarity in medical imaging.

As noted above, imaging of one or more substances that can affect clarity of medical imaging is combined with tissue imaging. FIG. 3 illustrates an exemplary method 300 for combining tissue imaging with imaging of one or more clarity-affecting substances. Method 300 can be used to combine single snapshots and/or video frames of tissue imaging with single snapshots and/or video frames of imaging of one or more substances. Method 300 uses a tissue frame 302, a clarity-affecting substance frame 304, and a clear frame 306 generated from the same fixture or setup used to capture the clarity-affecting substance frame 304 (i.e., a frame captured without any of the one or more substances in the field of view). The clear frame 306 can be used for isolating the one or more substances in the clarity-affecting substance frame 304, as discussed in more detail below. In the example illustrated in FIG. 3, each of the tissue frame 302, the clarity-affecting substance frame 304, and the clear frame 306 are endoscopic images that include circular field-of-view portions surrounded by dark, non-field-of-view regions. However, this is merely exemplary, and in some variations, the field of view occupies the entire frame.

One or more of the tissue frame 302, clarity-affecting substance frame 304, and clear frame 306 may be scaled and/or aligned to match one or more of the other frames, at step 350. At step 352, the clear frame 306 is inverted by subtracting each pixel value from the maximum possible pixel value (for example, subtracting the pixel value from 255 for 8-bit pixel values). The output of step 352 (frame 310) is added to the clarity-affecting substance frame 304 at step 354. Pixel values that would be greater than the maximum possible pixel value when added are set to the maximum possible pixel value (for example, a value of 255 for 8-bit pixel values). Together, steps 352 and 354 effectively isolate the one or more substances in the imaging by converting all other pixels to a uniform value (e.g., a value of 255 for 8-bit pixel values).

At step 356, the output from step 354 (frame 312) is inverted by subtracting each pixel value from the maximum possible pixel value, resulting in frame 314 in which the colors of the frame 312 have been inverted. At step 358, the inverted frame 314 is then subtracted from the tissue frame 302, with any values that would be less than zero being set to 0. As illustrated, the output of step 358 is a frame 316 that combines the tissue from the tissue frame 302 and the blood from the clarity-affecting substance frame 304. Frame 316 can be used in training a machine learning model to detect blood in an arthroscopic image.

Figure 4:
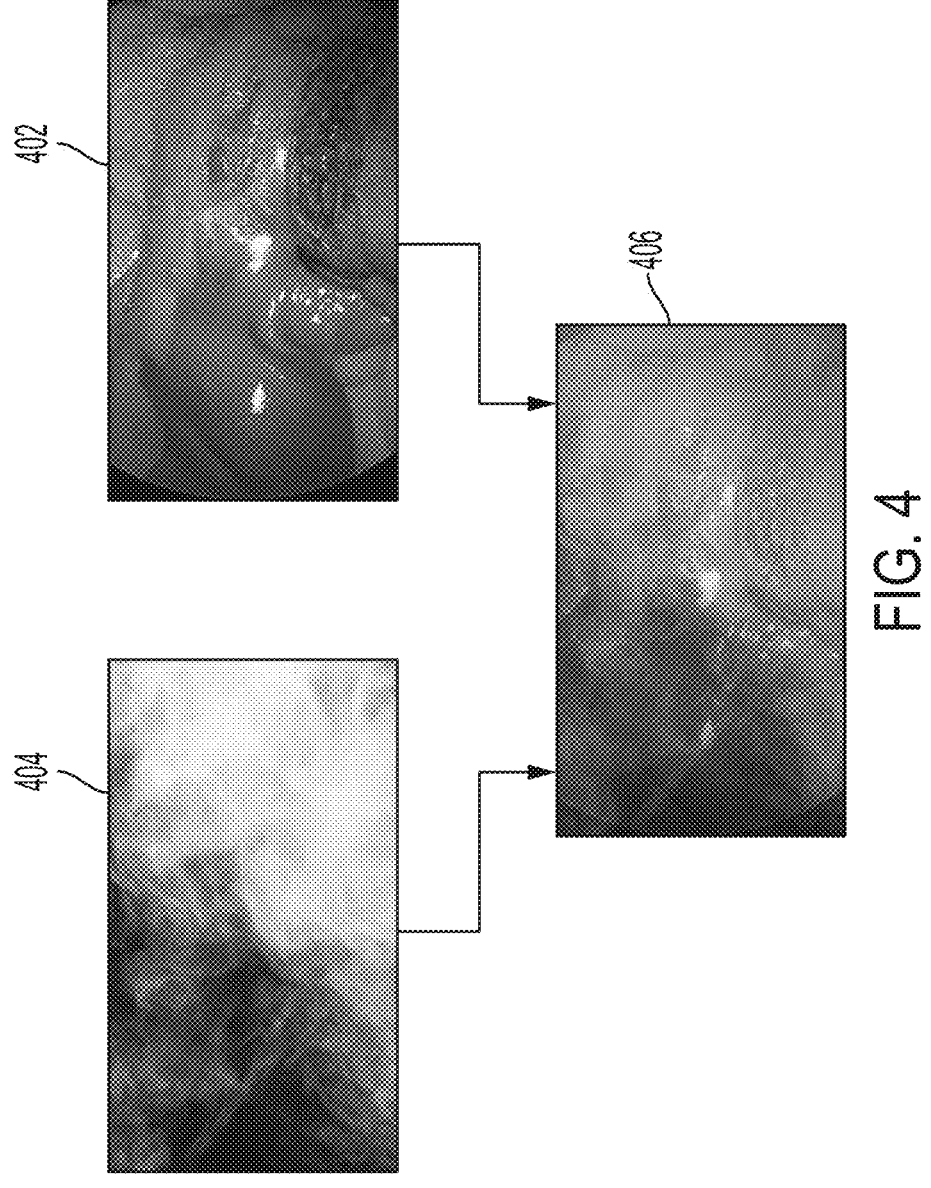
FIG. 4 illustrates an example of combining a tissue image with an image of smoke.

Method 300 is merely one example of a process for combining tissue imaging with imaging of one or more substances that can affect clarity of imaging. In some variations, the imaging is combined using a weighted average. One example of this is shown in FIG. 4 in which a tissue image 402 is combined with an image 404 of smoke using a weighted average to produce training image 406. Different weightings can be used to provide different degrees of smoke in the resulting training imaging. In some examples, imaging of one or more substances is converted to grayscale and then applied via a weighted average to each color channel of the tissue imaging. Optionally, contrast adjustment and/or filtering can be added, such as to make the resulting imaging more realistic.

Figure 5:
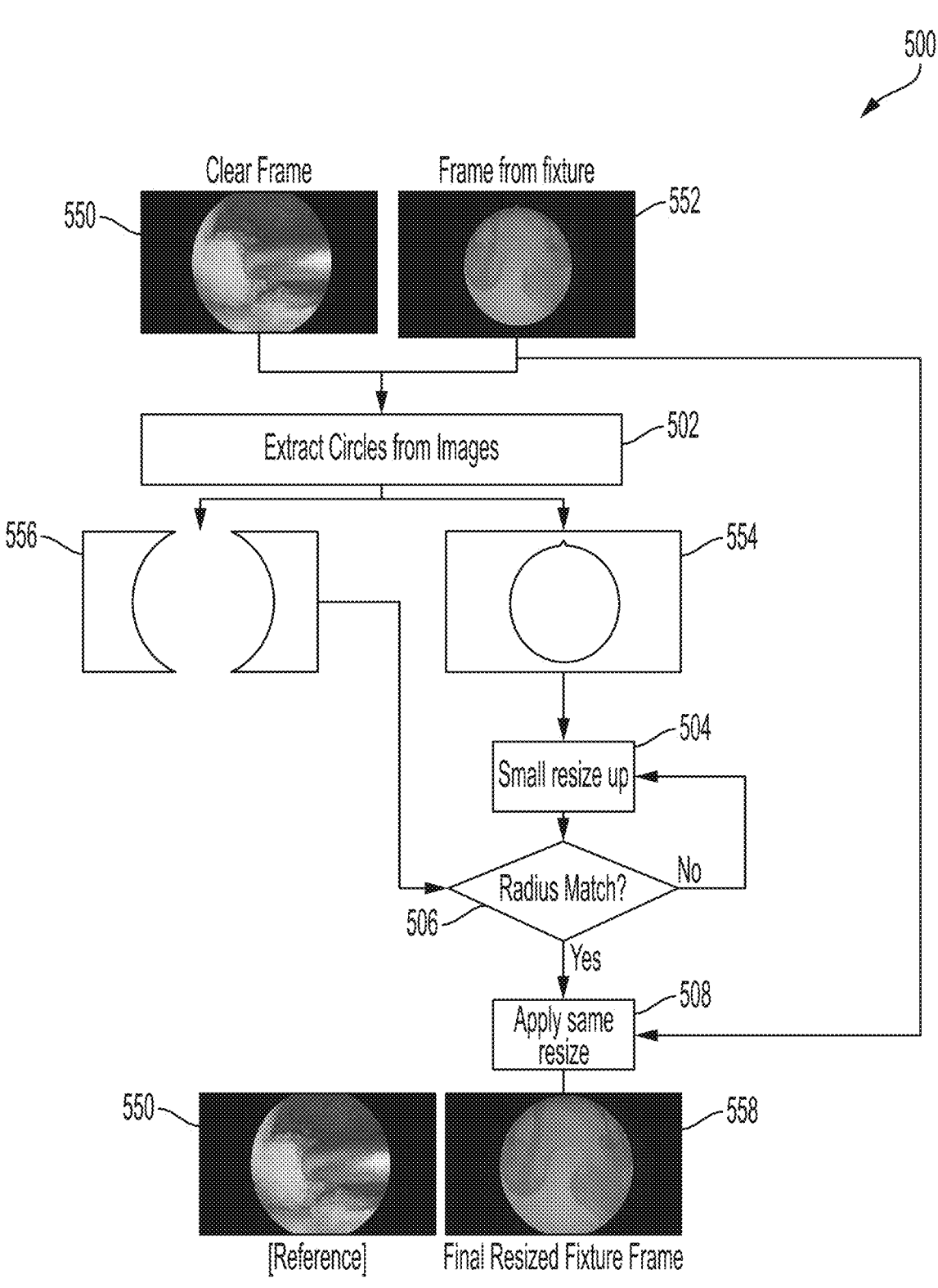
FIG. 5 illustrates an exemplary method for scaling a frame of one or more clarity affecting substances to match a tissue frame.

As noted above with respect to step 350, one or more of the tissue frame 302, the clarity-affecting substance frame 304, and the clear frame 306 can be scaled and/or aligned to match one or more of the other frames. FIG. 5 illustrates an exemplary method 500 for scaling a clarity-affecting substance frame to match a tissue frame, which could be used, for example, in step 350 of method 300. Method 500 may be used on endoscopic images that include a field-of-view portion surrounded by a non-field-of-view portion such that the field-of-view portions of the images are matched to one another. The differences in size of the field-of-view portions of the images may be due, for example, to the use of different endoscopic imagers and/or different endoscopes.

At step 502, the non-field-of-view portions of a tissue frame 550 and a clarity-affecting substance frame 552 are extracted from the respective images. At step 504, the non-field-of-view portion 554 of the clarity-affecting substance frame 552 is resized up, for example, by a predefined increment. At step 506, the resized non-field-of-view portion of the clarity-affecting substance frame 552 is compared to the non-field-of-view portion 556 of the tissue frame 550 to determine whether the sizes match. If the sizes do not match, steps 504 and 506 are repeated until the sizes do match (or match within a predefined amount). Once the sizes are determined to match at step 506, the amount of resizing required for the non-field-of-view portions 554, 556 to match is applied to the clarity-affecting substance frame 552, resulting in a resized clarity-affecting substance frame 558 that matches the tissue frame 550 in size of the field-of-view portion. These frames can then be combined, such as detailed above with respect to method 300. In variations that use a clear frame, such as described above with respect to method 300, the same amount of resizing determined for the clarity-affecting substance frame 552 can be applied to the clear frame or method 500 may be performed again for the clear frame.

Method 500 is merely one example of a technique for resizing frames to match one another, and it will be understood by one of skill in the art that other techniques may be used. For example, in some variations, the borders of the field-of-view portions of the tissue frame 550 and the clarity-affecting substance frame 552 are identified, such as using an edge detection technique to locate the sharp contrast between the field-of-view portion and the surrounding non-field-of-view portion, and their radiuses or diameters measured and compared to determine the required amount of scaling.

Figure 10:
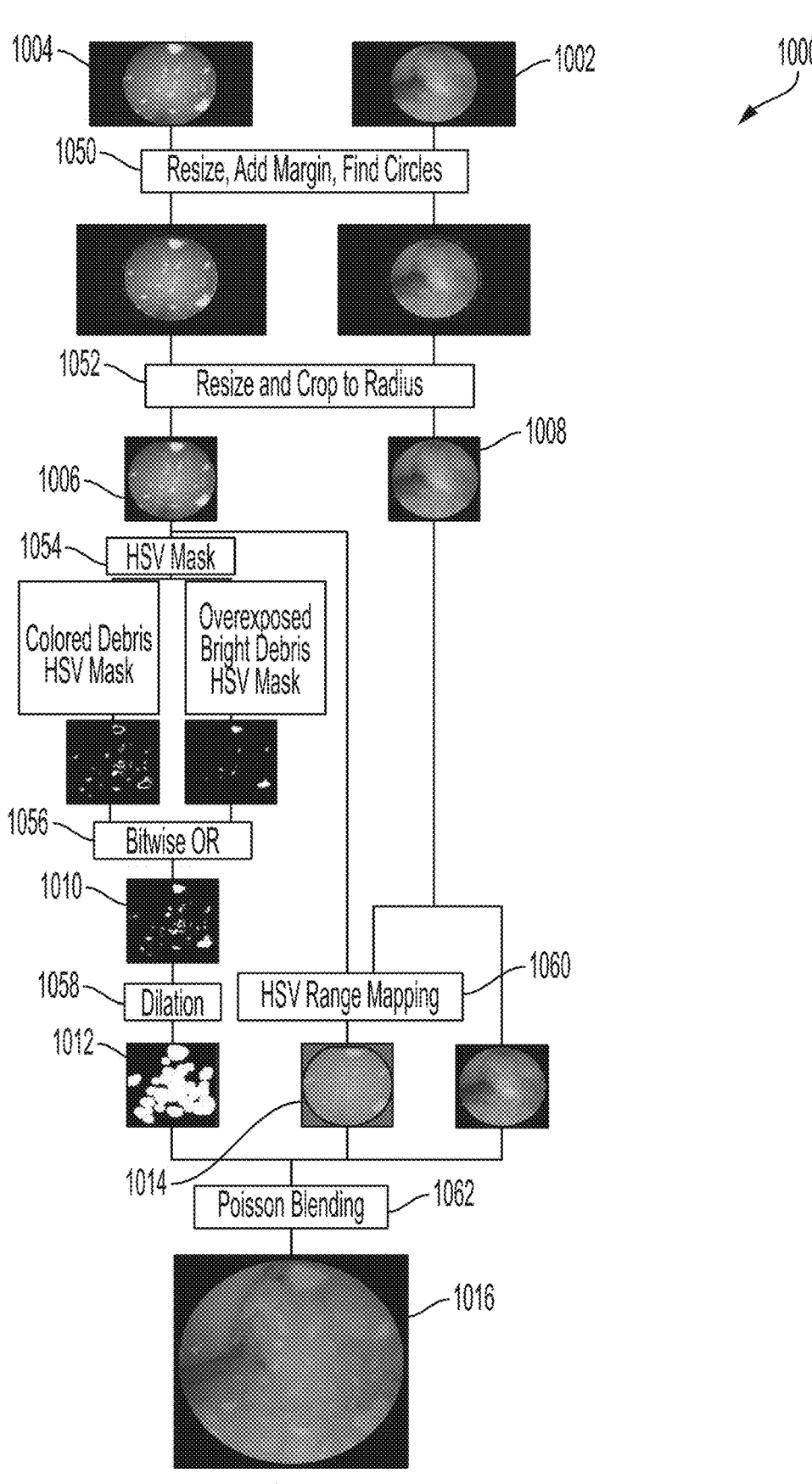
FIG. 10 illustrates an exemplary method for combining tissue imaging with imaging of debris.

As noted above, substances that can affect clarity of imaging can include debris. As such, step 106 of method 100 of FIG. 1 can include combining imaging of tissue with imaging of simulated debris into imaging that can be used to train a machine learning model to detect debris in imaging of tissue. FIG. 10 illustrates a method 1000 that can be used at step 106 of method 100 for combining tissue imaging with imaging of debris to generate imaging that can be used to train a machine learning model to detect debris visible within imaging of tissue. Method 1000 can be used to combine single snapshots and/or video frames of tissue imaging with single snapshots and/or video frames of imaging of simulated debris. Method 1000 uses a tissue frame 1002 and a debris frame 1004 that may be generated using a fixture, such as fixture 200 of FIGS. 2A and 2B. In the example illustrated in FIG. 10, each of the tissue frame 1002 and the debris frame 1004 are endoscopic images that include circular field-of-view portions at least partially surrounded by dark, non-field-of-view regions. However, this is merely exemplary, and in some variations, the field of view occupies the entire frame.

The debris frame 1004 may be generated by injecting into a fixture (such as fixture 200 of FIGS. 2A and 2B) a substance that simulates the type of debris that may be present when imaging tissue. For example, the substance may simulate pieces of tissue, such as pieces of cartilage or bone. An imager (e.g., imager 204 of FIGS. 2A and 2B) may capture the debris frame 1004 while the substance that simulates the debris is within the field of view of the imager. As explained in more detail below, the simulated debris in the debris frame 1004 is extracted from the debris frame 1004 and merged with the tissue frame 1002. To simplify the identification of the simulated debris in the debris frame 1004, the simulated debris may have a color that provides contrast with the background of the debris frame 1004. For example, the simulated debris may be dyed green, red, blue, or any other color.

At step 1050, the tissue frame 1002 and the debris frame 1004 may each be resized to a predetermined size, such as 256 pixels in height. Resizing can include calculating the ratio of height and width and maintaining that ratio throughout the resizing process, adding black margins if necessary. Next, the circular field-of-view portions of the tissue frame 1002 and the debris frame 1004 are aligned. This can be done using a suitable feature extraction technique that can locate a circle in an image, such as a Hough Circle Transform, which can determine the center point and radius of a circle in an image. Prior to applying the Hough Circle Transform, a black margin can be added to the top and bottom of each of the tissue frame 1002 and the debris frame 1004 to account for images in which the circular field-of-view portion is cut off. Each of the tissue frame 1002 and the debris frame 1004 can then be converted to a black and white image by assigning a value of 0 to pixels that have values below a threshold (e.g., 40) and assigning a maximum value (e.g., 255) to pixels that are above the threshold. The Hough Circle Transform can then be applied to the black and white images to extract the position and size of the circular field-of-view portions in each image. Alternatively, locations and sizes of the circular field-of-view portions may be determined using a machine learning model trained to segment the circular field-of-view portions in tissue frames and the debris frames.

At step 1052, the debris frame 1004 and/or the tissue frame 1002 is resized so that the radii of the circular field-of-view portions match. The tissue frame 1002 and debris frame 1004 are each cropped so that the sides of the respective images are tangent with the circular field-of-view portion, resulting in two square frames of equal sizes—a resized and cropped debris frame 1006 and a resized and cropped tissue frame 1008.

At step 1054, the resized and cropped debris frame 1006 is segmented to extract the simulated debris. This step can include converting the resized and cropped debris frame 1006 to a hue-saturation-value (HSV) color space in which the color of each pixel is in a single channel (the hue). Two masks are generated: one mask focused on the color of the simulated debris (e.g., green, red, blue, etc.) and one mask focused on capturing overexposed portions of the simulated debris, which may appear brighter (e.g., white). The color-focused mask may be generated by assigning a value of white (e.g., 255) to all pixels that have a hue (h) that is within a range suitable for the color of the simulated debris. For example, for green simulated debris, the range of hue may be 30<h<95. Ranges for saturation (s) and/or value (v) may also be used such that pixels that have hue, saturation, and value that are within the ranges are given a value of white. For example, pixels that have hue, saturation, and value within the ranges 30<h<95, 35<s<255, and 180<v<255 may be assigned values of white. These ranges are merely exemplary, and it will be understood by a person having ordinary skill in the art that the ranges can be selected based on the color of the simulated debris and any other characteristics of the simulated debris and/or fixture set-up. Pixels that do not fall within the range(s) are assigned a value of black. The mask focused on capturing overexposed bright portions of the simulated debris is generated by assigning a value of white to pixels that have hue, saturation, and value that are in suitable ranges and assigning a value of black to pixels that have hue, saturation, and value that are outside of the ranges. An exemplary set of ranges is 0<h<255, 0<s<50, and 180<v<255.

At step 1056, the two masks from step 1054 are combined into a combined mask 1010 using a bitwise OR operation so that any white pixel from either mask carries forward into the combined mask 1010. At step 1058, a suitably sized and shaped kernel can be used to dilate the combined mask 1010 to expand the edges of the segmented debris, resulting in a dilated debris mask 1012. For example, a 25 pixel major axis and 25 pixel minor axis ellipse-shaped kernel may be used to generate the dilated debris mask 1012.

At step 1060, the resized and cropped debris frame 1006 is converted to an image that better matches the color temperature of the resized and cropped tissue frame 1008 using a hue, saturation, and value range mapping process. The color temperature of the resized and cropped tissue frame 1008 can be determined based on the average hue of the field-of-view portion of the resized and cropped tissue frame 1008. To determine the average hue of the resized and cropped tissue frame 1008, the background outside of the field-of-view portion (located at step 1050) is assigned a value of black by drawing concentric circles with that value. Then, the image is converted to HSV color space and an average hue is computed for pixels that have hue that is above the value of black (hue value of 0). The average hue is compared to a plurality of hue categories to determine a color temperature category for the resized and cropped tissue frame 1008. A first hue category could be defined to correspond to a warm color temperature (e.g., yellow to reddish) and a second hue category could be defined to correspond to a cool temperature (e.g., blue to green). The warm color temperature category could be defined as including hues in the ranges 0<h<30 and 150<h<180, with the cool color temperature category including hues outside of these range. More than two color temperature categories could be defined in similar fashion.

To convert the resized and cropped debris frame 1006 to have a color that better matches the resized and cropped tissue frame 1008, the hue of the resized and cropped debris frame 1006 is mapped onto a range that is dependent on the color temperature category determined for the resized and cropped tissue frame 1008. For example, given the warm and cool categories defined above, if the color temperature category for the resized and cropped tissue frame 1008 is the warm category, the hue of each pixel in the resized and cropped tissue frame 1008 may be mapped to the range 20<h<30, and if the color temperature category is the cool category, the hue of each pixel in the resized and cropped tissue frame 1008 may be mapped to the range 30<h<150. Saturation and value are taken from the resized and cropped debris frame 1006 and mapped to suitable ranges that may depend on the color temperature category determined for the resized and cropped tissue frame 1008. For example, for the warm category, saturation and value of the resized and cropped debris frame 1006 may be mapped to the range 0<s<10 and 110<v<200, and for the cool category, saturation and value of the resized and cropped debris frame 1006 may mapped to the range 0<s<10, 160<v<200.

Mapping of the hue, saturation, and value to the respective ranges can include normalizing each of the hue, saturation, and value for each pixel to a value between 0 and 1, multiplying the results of the normalization by the span of the range, and adding the result to the minimum value of the range. For example, a saturation of 190 may be divided by 255 to get 0.75, which may then be multiplied by 10 (the span of 0<s<10) to get 8 (rounded up), which is added to the minimum of the range (0), resulting in a saturation value of 8. This mapping can be performed for the hue, saturation, and value for every non-black pixel, resulting in an HSV range-mapped image 1014.

At step 1062, a blending algorithm can be used to combine portions of the HSV range-mapped image 1014, as defined by the dilated debris mask 1012, with the resized and cropped tissue frame 1008. An example of a suitable blending algorithm is the Poisson blending algorithm, which evaluates the gradient at the edges of the dilated debris mask 1012 and changes the values of the HSV range-mapped image 1014 to blend with the resized and cropped tissue frame 1008. The blending of the HSV range-mapped image 1014 into the resized and cropped tissue frame 1008 results in a training image 1016 that includes tissue and simulated debris.

Figure 11:
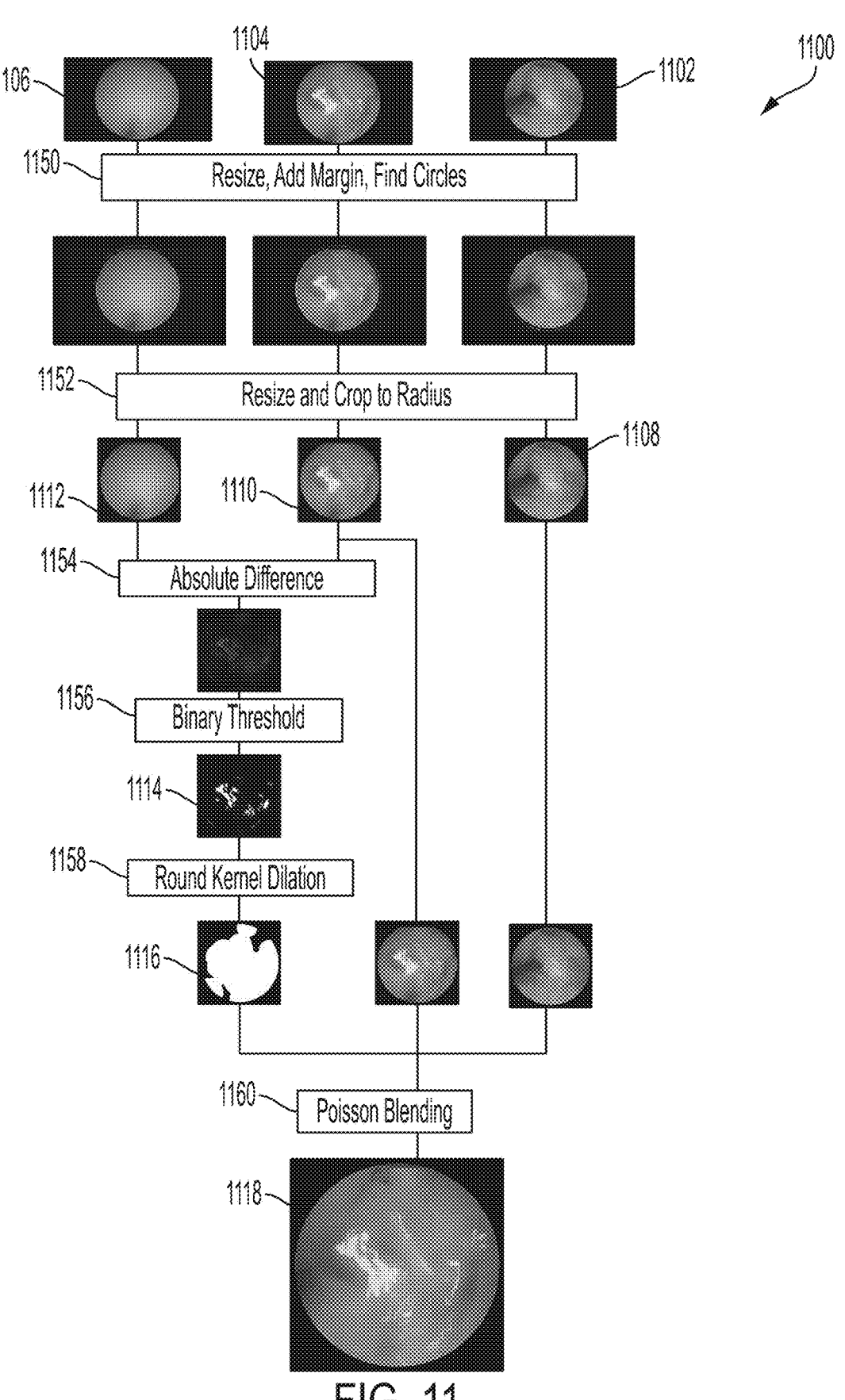
FIG. 11 illustrates an exemplary method for combining tissue imaging with imaging of bubbles.

As noted above, substances that can affect clarity of imaging can include bubbles. As such, step 106 of method 100 of FIG. 1 can include combining imaging of tissue with imaging of bubbles into imaging that can be used to train a machine learning model to detect bubbles in imaging of tissue. FIG. 11 illustrates a method 1100 that can be used at step 106 of method 100 for combining tissue imaging with imaging of bubbles to generate imaging that can be used to train a machine learning model to detect bubbles in imaging of tissue. Method 1100 can be used to combine single snapshots and/or video frames of tissue imaging with single snapshots and/or video frames of imaging of bubbles. Method 1100 uses a tissue frame 1102, a bubble frame 1104 that may be generated using a fixture, such as fixture 200 of FIGS. 2A and 2B, and a background frame 1106 that captures the background of the fixture used to generate the bubble frame 1104. In the example illustrated in FIG. 11, each of the tissue frame 1102, bubble frame 1104, and background frame 1106 are endoscopic images that include circular field-of-view portions at least partially surrounded by dark, non-field-of-view regions. However, this is merely exemplary, and in some variations, the field of view occupies the entire frame.

The bubble frame 1104 may be generated by injecting bubbles into a fixture (such as fixture 200 of FIGS. 2A and 2B). An imager (e.g., imager 204 of FIGS. 2A and 2B) may capture the bubble frame 1104 while bubbles are within the field of view of the imager. As explained in more detail below, bubbles in the bubble frame 1104 are extracted from the bubble frame 1104 and merged with the tissue frame 1102.

At step 1150, the tissue frame 1102, the bubble frame 1104, and the background frame 1106 may each be resized to a predetermined size and the radii of their circular field-of-view portions are determined. This step is similar to step 1050 of method 1000 and, thus, its details are omitted for simplicity. At step 1152, one or more of the tissue frame 1102, the bubble frame 1104, and the background frame 1106 are resized so that the radii of the frames match and the frames are cropped to the field of view portions, resulting in a resized and cropped tissue frame 1108, resized and cropped bubble frame 1110, and resized and cropped background frame 1112. This step is similar to step 1052 of method 1000, so its details are omitted for simplicity.

At step 1154, the absolute difference between the resized and cropped bubble frame 1110 and resized and cropped background frame 1112 is calculated by performing pixel-by-pixel subtraction. The results are compared to a threshold (e.g., a threshold of 40) at step 1156 to generate a mask 1114 of black and white pixels only.

Since the mask 1114 may not capture all edges of the bubbles, a dilation operation is performed at step 1158 with a suitably sized kernel (e.g., a 70 pixel by 70 pixel elliptical kernel). The size of the kernel may be selected based on the size of the bubbles. For example, smaller bubbles require a smaller kernel for a tighter fit. Since dilation may expand beyond the circular field-of-view portion, step 1158 may include applying a binary threshold to any one of the resized and cropped tissue frame 1108, resized and cropped bubble frame 1110, and resized and cropped background frame 1112 to generate a mask of a white circle on a black background and performing a bitwise AND operation on this mask and the dilated mask to limit the dilated bubbles to within the circular field-of-view portion. Step 1158 results in a dilated bubble mask 1116.

At step 1160, a blending algorithm, such as a Poisson blending algorithm, is used to combine portions of the resized and cropped bubble frame 1110, as defined by the dilated bubble mask 1116, with the resized and cropped tissue frame 1108. This results in a training image 1118 that includes tissue and bubbles.

Method 1100 can also be used to generate a training image that includes a surgical tool, such as a cutting tool. A fixture, such as fixture 200 of FIGS. 2A and 2B, can be used to capture an image of a surgical tool inserted into the fixture. Using the fixture in combination with the surgical tool, the tool may be rotated in real time to position the tool in various different locations and orientations in the imaging frame. The resulting surgical tool image can be used instead of the bubble frame 1104 in method 1100 to generate a training image that includes tissue and the surgical tool.

Method 1100 can also be used to generate a training image that includes a medical device, such as one or more sutures. The resulting medical device image can be used instead of the bubble frame 1104 in method 1100 to generate a training image that includes tissue and the medical device (e.g., sutures).

As described above, a machine learning model can be configured to detect one or more substances that affect clarity of medical imaging by training the machine learning model on training data in which the one or more substances are artificially added to tissue imaging and/or training data generated by one or more machine learning models (e.g., generative adversarial networks, or GANs). It may be desirable instead of or in addition to detecting the one or more clarity-affecting substances to detect a component of the imaging other than the one or more substances and to do so when the one or more substances are present in the imaging. To make a machine learning model more robust in detecting the one or more components when the one or more substances are present in the imaging, a technique similar to that described above can be used to create training data in which the one or more substances are artificially added to tissue imaging that includes the one or more components of interest. The training data can then be used to train a machine learning model to detect the one or more components in imaging in which the one or more substances affect clarity of the one or more components.

Figure 9:
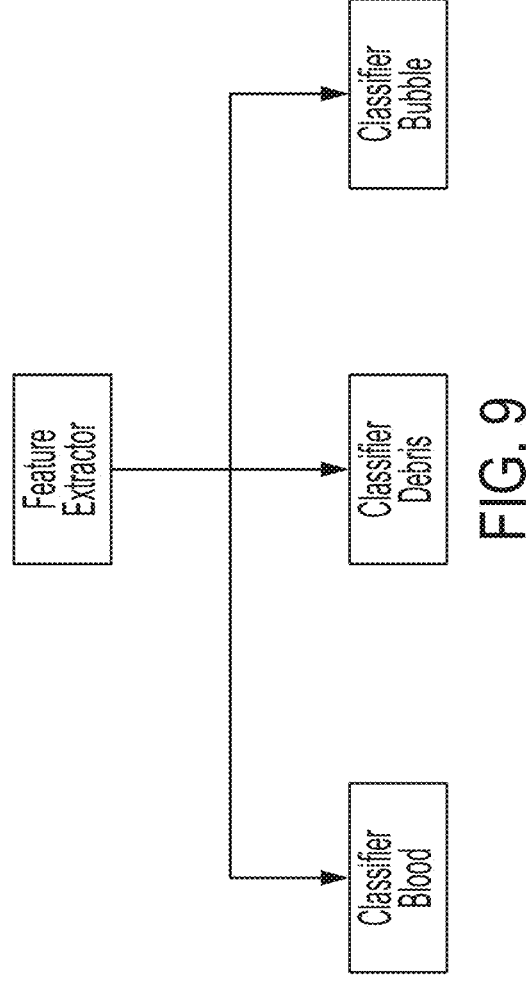
FIG. 9 is a block diagram of an exemplary machine learning model for detecting one or more substances in imaging.

An example of a machine learning model for detecting multiple substances that affect clarity of medical imaging is illustrated in FIG. 9. The machine learning model 900 is a deep learning model that includes a feature extractor 902 that feeds into a classifier 904 for each substance to be detected. In the illustrated example, the machine learning model 900 is configured for detecting blood, debris, and bubbles and includes a classifier for each. The machine learning model 900 can include a number of classifiers for detecting any number of substances desired.

FIG. 6 is a block diagram of a method 600 for training a machine learning model to detect one or more components of interest in imaging when the imaging includes one or more substances that affect clarity. At step 602, imaging of tissue associated with a medical procedure type is received. Step 602 is similar to step 102 of method 100. At step 604, imaging of one or more substances that can affect clarity of imaging associated with the medical procedure type is received. Step 604 is similar to step 104 of method 100. At step 606, the tissue imaging is labeled for one or more components in the imaging that are different than the one or more substances. The one or more components can be an anatomical feature, such as a feature of a bone, a vessel, an abnormality of the tissue, a tumor, or a particular type of tissue, or a non-anatomical feature, such as an instrument, implant, other foreign object, or other device. The tissue imaging can be labeled in any suitable fashion, such as using bounding boxes or segmentation. At step 608, the labeled tissue imaging from step 606 is combined with the imaging of the one or more substances from step 604 to produce training data. This step is similar to step 106 of method 100. The training data resulting from step 608 is imaging that includes the one or more substances obscuring at least a portion of the one or more components labeled in the imaging, as well as the labeling data. The training data can then be used, at optional step 610, to train a machine learning model to detect the one or more components in imaging that also include the one or more substances. For example, the machine learning model can be trained to detect particular tissue structure in laparoscopic imaging when smoke is present in the field of view. Training a machine learning model with training data generated according to method 600 can make the machine learning model more robust when faced with imaging that includes the one or more substances that affect the clarity of the one or more components in the imaging.

In some variations, a machine learning model can be trained to detect both one or more substances that affect clarity of the imaging and one or more components of interest in the imaging that are at least partially obscured by the one or more substances. A system using such a machine learning model could automatically respond to detection of the one or more components (such as by provided the user with a visual indication, as discussed further below) and could automatically trigger a clarity improving response, as discussed further below.

Figure 7B:
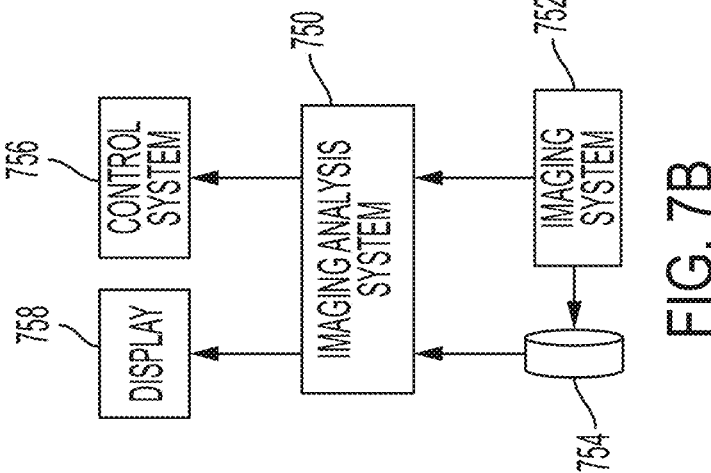
FIG. 7B is a functional block diagram of an exemplary imaging analysis system that may use one or more machine learning models generated by machine learning model training system of FIG. 7A to automatically detect one or more substances in medical imaging that affect visibility of tissue in the imaging or to identify one or more components in the imaging in the presence of the one or more substances that are at least partially obscuring at least a portion of the one or more components.
Figure 7A:
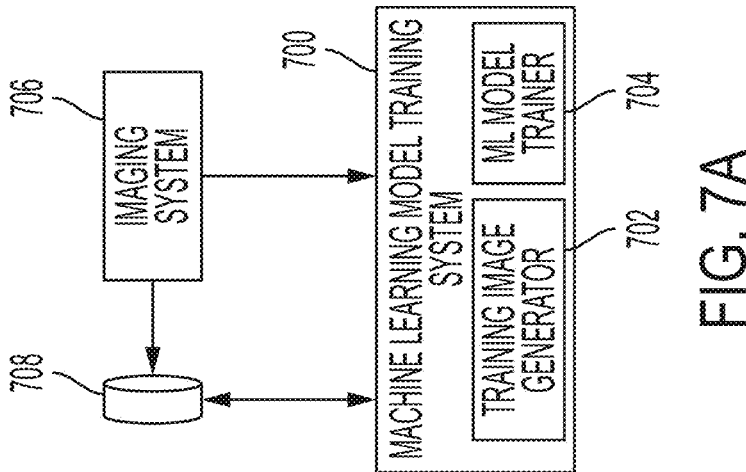
FIG. 7A is a functional block diagram of an exemplary machine learning model training system.

FIG. 7A is a functional block diagram of an exemplary machine learning model training system 700 that can include a training image generator 702 for generating training images according to method 100 of FIG. 1 and/or method 600 of FIG. 6. Machine learning model training system 700 can also include a machine learning model trainer 704 that trains one or more machine learning models based on the training images generated by the training image generator 702 in accordance with optional step 108 of method 100 and/or optional step 610 of FIG. 6. Machine learning model training system 700 may be communicatively connected to one or more imaging systems 706 that generate images used for generated training image data. Machine learning model training system 700 may be communicatively connected to one or more data stores 708 that may store images used in generating training images and/or may store the training images themselves once generated.

A machine learning model trained by machine learning model training system 700 on training images generated according to method 100 may be used to identify one or more substances present in medical imaging that may be affecting visibility of tissue of interest within the imaging. The identification of the one or more substances can enable the triggering of an automatic response designed to improve the visibility of the tissue in one or more ways. For example, the pressure of a fluid pump may be increased to increase a flow rate through a region of tissue of interest to clear the one or more substances that are affecting clarity of the imaging. Alternatively or additionally, one or more image processing techniques may be used to improve visibility of the tissue of interest. For example, image processing may be used to artificially reduce or altogether eliminate the clarity-affecting substance from the imaging.

Additionally or alternatively, a machine learning model trained by a machine learning model training system 700 on training images generated according to method 600 may be used to identify one or more components in the imaging in the presence of the one or more substances that are at least partially obscuring at least a portion of the one or more components. The detection of the one or more components can be used, for example, for providing a visual indication associated with the one or more components in a display of the imaging (for example, one or more components of interest may be highlighted, outlined, or otherwise indicated in a displayed image and/or video) and/or for analyzing the one or more components in the imaging.

FIG. 7B is a functional block diagram of an exemplary imaging analysis system 750 that may use one or more machine learning models generated by machine learning model training system 700 to automatically detect one or more substances in medical imaging that affect visibility of tissue in the imaging and/or to identify one or more components in the imaging in the presence of the one or more substances that are at least partially obscuring at least a portion of the one or more components. Imaging analysis system 750 may be a computing system for analyzing imaging generated during a medical imaging session. The imaging analysis system 750 can be located in a medical room or could be located at a remote location, such as in an adjoining room, another location in the facility, or remotely from the facility. In some variations, the computing system is located in an operating room for analyzing intraoperatively generated images. In some variations, the imaging analysis system 750 is used for analyzing pre-generated imaging. Imaging analysis system 750 may receive imaging from an imaging system 752 (directly or through one or more communication networks) and/or from a data store 754 storing the imaging.

The imaging analysis system 750 may use one or more machine learning models trained by machine learning model training system 700 to analyze the imaging to detect one or more substances in the imaging that affect visibility of tissue in the imaging. For example, the imaging analysis system 750 may detect smoke, blood, debris, and/or bubbles in imaging received intraoperatively from imaging system 752. The detection of one or more substances in the imaging that affect visibility of tissue of interest in the imaging may trigger one or more actions for improving visibility of the tissue of interest in the imaging. For example, a control system 756 may control a fluid pump to increase a fluid flow to clear the one or more substances from the field of view. In some variations, the imaging analysis system 750 or a connected system may use one or more image processing techniques to improve clarity or otherwise enhance the imaging, such as by removing or minimizing the appearance of the one or more substances in the imaging. The enhanced imaging may be displayed on one or more displays 758.

The imaging analysis system 750 may use one or more machine learning models trained by machine learning model training system 700 to identify one or more components in the imaging in the presence of the one or more substances that are at least partially obscuring at least a portion of the one or more components. The detection of one or more substances in the imaging that affect visibility of tissue of interest in the imaging may trigger one or more actions. For example, the imaging analysis system 750 or a connected system may generate a visualization based on the detection of the one or more components, which could include highlighting or outlining the one or more components in the imaging. The visualization could be displayed on display 758 for visualizing by one or more medical personnel, such as by one or more surgeons during a surgical procedure for guiding the surgeon in the surgical procedure. Additionally or alternatively, a quantitative analysis may be performed for the detected component(s).

The blocks of FIGS. 7A and 7B are intended merely to illustrate functional components and are not intended to imply that various functions are performed by the same or different physical systems. For example, the training image generator 702 and machine learning model trainer 704 can be functional portions of the same computing system or can be implemented by different computing systems. Similarly, the imaging analysis system 750 and control system 756 may be implemented by the same computing system or different computing systems.

Figure 8:
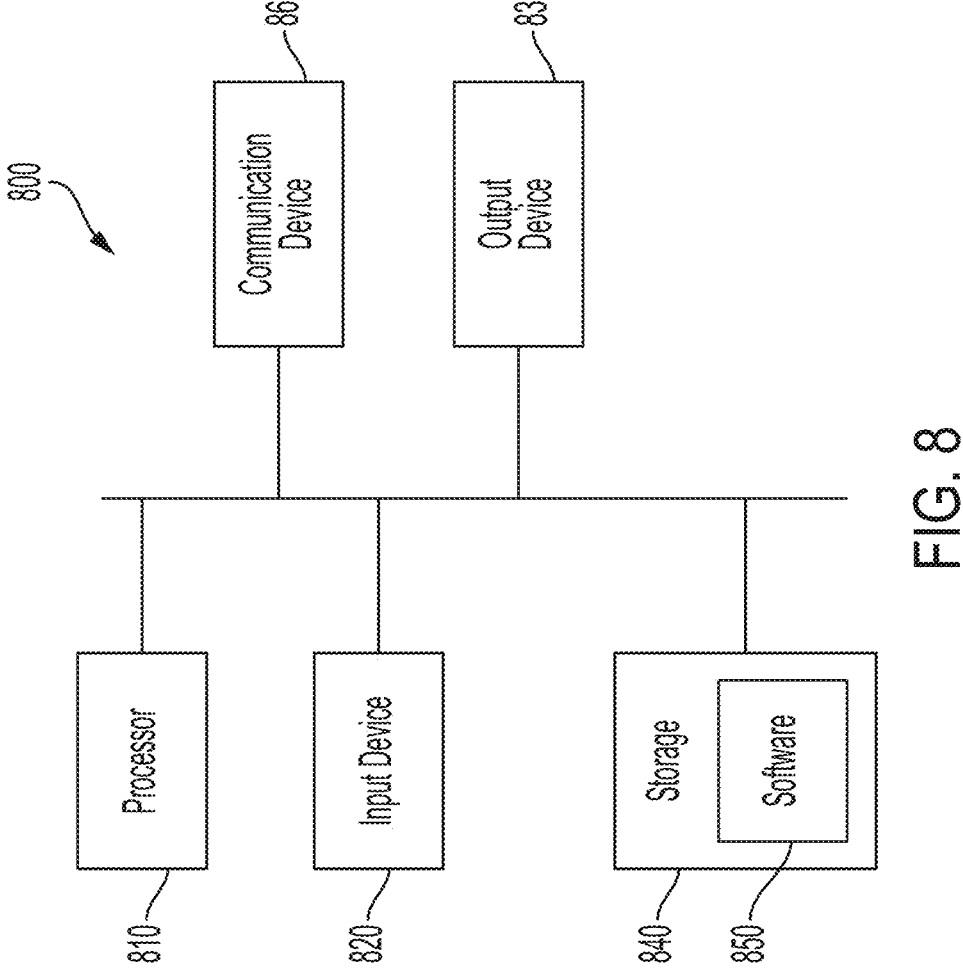
FIG. 8 illustrates an example of a computing system.

FIG. 8 illustrates an example of a computing system 800, in accordance with some embodiments, that can be used for one or more components of system 700 of FIG. 7A and/or one or more components of system 750 of FIG. 7B. System 800 can be a computer connected to a network, such as one or more networks of hospital, including a local area network within a room of a medical facility and a network linking different portions of the medical facility. System 800 can be a client or a server. As shown in FIG. 8, system 800 can be any suitable type of processor-based system, such as a personal computer, workstation, server, handheld computing device (portable electronic device) such as a phone or tablet, or dedicated device. The system 800 can include, for example, one or more of input device 820, output device 830, one or more processors 810, storage 840, and communication device 860. Input device 820 and output device 830 can generally correspond to those described above and can either be connectable or integrated with the computer.

Input device 820 can be any suitable device that provides input, such as a touch screen, keyboard or keypad, mouse, gesture recognition component of a virtual/augmented reality system, or voice-recognition device. Output device 830 can be or include any suitable device that provides output, such as a display, touch screen, haptics device, virtual/augmented reality display, or speaker.

Storage 840 can be any suitable device that provides storage, such as an electrical, magnetic, or optical memory including a RAM, cache, hard drive, removable storage disk, or other non-transitory computer readable medium. Communication device 860 can include any suitable device capable of transmitting and receiving signals over a network, such as a network interface chip or device. The components of the computing system 800 can be connected in any suitable manner, such as via a physical bus or wirelessly.

Processor(s) 810 can be any suitable processor or combination of processors, including any of, or any combination of, a central processing unit (CPU), graphics processing unit (GPU), field programmable gate array (FPGA), and application-specific integrated circuit (ASIC). Software 850, which can be stored in storage 840 and executed by one or more processors 810, can include, for example, the programming that embodies the functionality or portions of the functionality of the present disclosure (e.g., as embodied in the devices as described above). For example, software 850 can include one or more programs for execution by one or more processor(s) 810 for performing one or more of the steps of method 100, method 300, and/or method 500.

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for training a machine learning model to detect substances that compromise medical imaging clarity, the method comprising:

receiving imaging of tissue associated with a medical procedure type;

receiving imaging of one or more substances that can affect clarity of imaging associated with the medical procedure type, wherein the one or more substances in the imaging of the one or more substances are not inside a body of a subject;

combining at least a portion of the imaging of the tissue and at least a portion of the imaging of the one or more substances to generate machine learning training image data in which at least a portion of the tissue is at least partially obscured by the one or more substances; and training, with the training image data, a machine learning model to detect the one or more substances in imaging generated during a medical procedure of the medical procedure type.

2. The method of claim 1, wherein the imaging of the tissue and the imaging of the one or more substances were captured by the same type of imaging device.

3. The method of claim 1, wherein the imaging of the tissue and the imaging of the one or more substances were captured by one or more endoscopic imagers.

4. The method of claim 1, wherein the imaging of the one or more substances was generated using a fixture through which the one or more substances were directed.

5. The method of claim 4, wherein combining at least a portion of the imaging of the tissue and at least a portion of the imaging of the one or more substances comprises isolating the one or more substances in the at least a portion of the imaging of the one or more substances using a clear frame of the fixture.

6. The method of claim 1, wherein the imaging of tissue associated with a medical procedure type is free of the one or more substances.

7. The method of claim 1, wherein the one or more substances comprise smoke, blood, debris, or bubbles.

8. The method of claim 7, wherein the blood is synthetic blood or blood modified with anticoagulant.

9. The method of claim 1, wherein combining at least a portion of the imaging of the tissue and at least a portion of the imaging of the one or more substances comprises isolating portions corresponding to the one or more substances in the at least a portion of the imaging of the one or more substances, inverting colors of the isolated portion, and subtracting the inverted colors of the isolated portions from the at least a portion of the imaging of the tissue.

10. The method of claim 1, wherein combining at least a portion of the imaging of the tissue and at least a portion of the imaging of the one or more substances comprises at least one alignment, rotation, or translation step.

11. The method of claim 1, wherein combining at least a portion of the imaging of the tissue and at least a portion of the imaging of the one or more substances comprises extracting respective circles from the at least a portion of the imaging of the tissue and the at least a portion of the imaging of the one or more substances, determining a resizing for matching the respective circles, and applying the resizing to at least one of the at least a portion of the imaging of the tissue and the at least a portion of the imaging of the one or more substances.

12. The method of claim 1, wherein the at least a portion of the imaging of the tissue is combined with the at least a portion of the imaging of the one or more substances using a weighted average.

13. A method for detecting substances that compromise medical imaging clarity, the method comprising:

receiving imaging generated during a medical procedure of a medical procedure type; and detecting one or more substances that compromise clarity in the imaging generated during the medical procedure using a machine learning model, wherein the machine learning model was trained on training image data generated by combining at least a portion of imaging of tissue associated with the medical procedure type and at least a portion of imaging of the one or more substances, wherein the one or more substances in the imaging of the one or more substances are not inside a body of a subject, such that at least a portion of the tissue is at least partially obscured by the one or more substances.

14. The method of claim 13, wherein the imaging generated during a medical procedure, the imaging of the tissue, and the imaging of the one or more substances were captured by the same type of imaging device.

15. The method of claim 13, wherein the imaging generated during a medical procedure, the imaging of the tissue, and the imaging of the one or more substances were captured by one or more endoscopic imagers.

16. The method of claim 13, wherein the imaging of the one or more substances was generated using a fixture through which the one or more substances were directed.

17. The method of claim 16, wherein the at least a portion of the imaging of the tissue and the at least a portion of the imaging of the one or more substances were combined by isolating the one or more substances in the at least a portion of the imaging of the one or more substances using a clear frame of the fixture.

18. The method of claim 13, wherein the one or more substances comprise smoke, blood, debris, or bubbles.

19. The method of claim 13, wherein the training image data comprises multiple combinations of the at least a portion of the imaging of the tissue and the at least a portion of the imaging of the one or more substances, each combination differing in at least one of rotation and translation of the at least a portion of the imaging of the one or more substances.

20. A system for detecting substances that compromise medical imaging clarity, the system comprising one or more processors, memory, and one or more programs stored in the memory for execution by the one or more processors for:

receiving imaging generated during a medical procedure of a medical procedure type; and detecting one or more substances that compromise clarity in the imaging generated during the medical procedure using a machine learning model, wherein the machine learning model was trained on training image data generated by combining at least a portion of imaging of tissue associated with the medical procedure type and at least a portion of imaging of the one or more substances, wherein the one or more substances in the imaging of the one or more substances are not inside a body of a subject, such that at least a portion of the tissue is at least partially obscured by the one or more substances.

\* \* \* \* \*